(No Model.)

J. H. SAGER.
BICYCLE SADDLE.

No. 566,344. Patented Aug. 25, 1896.

WITNESSES:
O. C. Robbins
M. F. Reed

INVENTOR
James H. Sager
BY
Howard L. Osgood
ATTORNEY

UNITED STATES PATENT OFFICE.

JAMES H. SAGER, OF ROCHESTER, NEW YORK.

BICYCLE-SADDLE.

SPECIFICATION forming part of Letters Patent No. 566,344, dated August 25, 1896.

Application filed September 9, 1895. Serial No. 561,972. (No model.)

*To all whom it may concern:*

Be it known that I, JAMES H. SAGER, a citizen of the United States, and a resident of the city of Rochester, in the county of Monroe and State of New York, have invented a certain new and useful Bicycle-Saddle, of which the following is a specification, reference being had to the accompanying drawings, in which—

Figure 1:
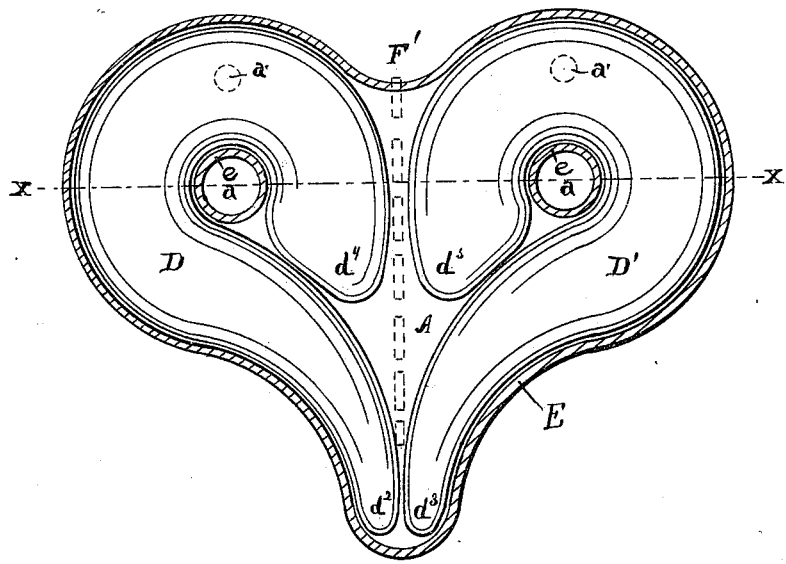
Figure 2:
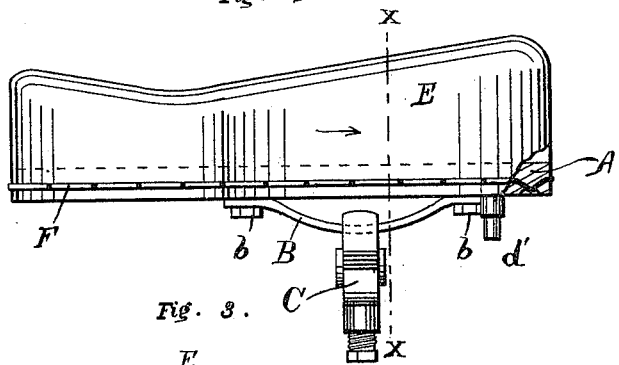
Figure 3:
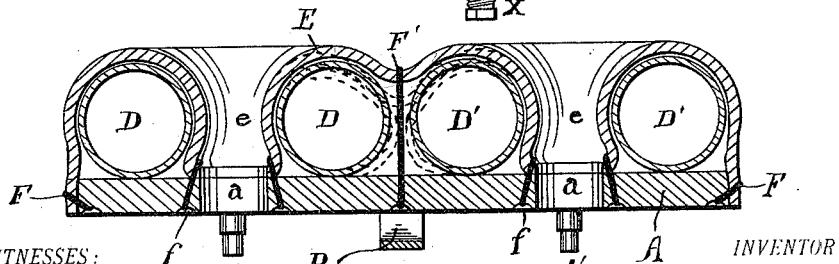

Figure 1 is a top plan view of my saddle with the cover removed. Fig. 2 is a side elevation of my saddle, a portion of the cover being removed; and Fig. 3 is a cross-section of my saddle on the line $x\ x$ of Figs. 1 and 2.

The modern safety-bicycle is made with a frame as rigid as possible, and in order that the rider may have a comfortable seat it has been customary to employ springs interposed between the bicycle-frame and the saddle-leather to prevent the shocks and shaking due to riding over rough ground. Some pneumatic saddles have been produced, which do not, however, conform to the requirements of a comfortable and practicable seat. These pneumatic saddles have been of two classes, of which one is a pneumatic bag of suitable form, which is suspended at its ends and is flexible throughout. This form of saddle is objectionable in that it clings too closely to the rider in all his positions and conforms itself too closely to his shape, and the result of this is a constant tendency to irritation and chafing. The other form of pneumatic saddle has a rigid base-plate on which is fastened one or more pneumatic cushions, in some cases arranged longitudinally of the saddle and in other cases transversely thereof. All of the cushions known to me in both of these classes of saddles have the serious defect of allowing the rider to "float" upon the cushion or cushions, meaning thereby that the seat of the rider is indefinite and insecure, because he moves about upon these cushions upon every change of position or of pressure, usually due to the downward thrust of the leg in propelling the machine. As one leg is depressed the pressure upon the cushion causes the air contained in it to move about within the cushion and to create an upward bulging at all points of the cushion except at the point where the leg in its downward thrust creates the greater pressure just mentioned. This bulging tends not only to raise the rider but also to move him sidewise, and thus tends to produce an uncertain seat.

In all bicycle-saddles it is important that there should be means of preventing pressure upon the perineum and at the end of the spine and of providing depressions in which the pelvic bones may rest, inasmuch as the ends of the pelvic bones are the parts which naturally take the pressure when a rider is in the seated position. In no prior saddle with which I am acquainted have all these objectionable features been eradicated, and it is the object of my invention to obviate these difficulties and to provide a comfortable saddle which is easy to construct, which is easily taken apart for repairs, and which, by reason of the elasticity of the pneumatic tubes, is sensitive to changes of pressure, but in which, at the same time, the cushions are incapable of displacement. I accomplish these results; and my invention consists in the parts and the arrangement thereof hereinafter described and claimed.

In the drawings, A is a rigid base-plate, which may be of any suitable material, but which I prefer to make of wood. In the form shown a curved bar B is fastened to the bottom of the base A by means of bolts $b$, and the bar is attached to a bicycle in any suitable manner, as by a clip C. The curvature of the bar B may be such as to provide for tilting the saddle to suit its rider. Instead of the bar B and clip C any other suitable device may be used for attaching the base-plate A to a bicycle. At two points $a\ a$, corresponding to the positions of the ends of the pelvic bones, the base-plate A is perforated, and at two other points $a'\ a'$ the base is perforated for the valves $d\ d'$ of the pneumatic pads. While the valves $d\ d'$ are shown at the extreme rear portion of the saddle, it is obvious that they may be attached to the pads at any convenient point. The edge of the base-plate A and the edges of the perforations $a\ a$ are provided with a series of holes for the purpose hereinafter described. The saddle shown in the drawings is intended principally for the use of women, and is broader and shorter than the saddle intended for the use of men, and, as will be seen in Fig. 1, it is in general form two circular cushions with a pommel-piece joining and extending from them.

Upon the base-plate A are placed two independent tubular pads D D', preferably made of elastic or soft india-rubber, for each of which is provided a valve $d\ d'$ of any suitable character. The pads are the same in form and are similarly disposed with reference to the medial longitudinal line of the saddle. As seen from above, each pad is contracted transversely at the pommel end $d^2\ d^3$ and gradually enlarges to the other end $d^4\ d^5$, and each pad follows, through the greater portion of its length, the exterior line of the side of the plate A on which it lies, and at the ends $d^4$ and $d^5$ the pads are curved around the perforations $a\ a$, so as to form a coiled annular cushion, from which extend the ends $d^2\ d^3$ to form the pommel of the saddle. Each pad therefore is of a partial S form. The cover E, of leather or of other flexible but inexpansible material, is stretched over both pads and is fastened to the exterior edge of the plate A in a suitable manner, but preferably by a lacing F, which passes through holes near the edge of the saddle-leather and through the holes above mentioned around the edge of the base-plate A. At points corresponding to the perforations $a\ a$ the saddle-leather is depressed or is drawn down by tubular extensions $e\ e$ to extend through the opening in the coil of the tubular pad down to the edge of the perforations $a\ a$, and is laced to said edges, as at $f$, whereby vertical apertures are made through the whole saddle on each side of the center thereof, thus holding the pads D D' firmly in place and providing ventilating-apertures for keeping the saddle cool, and depressions for the pelvic bones of the rider. Along the medial longitudinal line of the base-plate A and the cover E are a series of perforations for a lacing which may extend the whole length of the saddle, if desired, but which ordinarily it is unnecessary to extend for more than part of the length thereof. By means of the lacing F' the cover is drawn down along the line of the lacing toward the base-plate A, and thereby forms a depression along said medial line for preventing perineal pressure, and also holds the tubes D D' firmly in place and separate from each other. These lacings prevent both tubes or either tube from moving to one side or the other under eccentric or sidewise pressure, and thus I produce a firm but easy seat. As shown by the dotted lines in Fig. 3, the lacing F' may be drawn down more or less to increase or reduce the area and depth of the perineal depression, and thus the saddle is adapted to fit different riders independently of the weight of the rider or of the degree of inflation of the pneumatic pads.

The following results, among others, are produced by my saddle: When the rider, sitting in the usual riding position, presses downward, in pedaling, on one side or the other of the saddle, the pneumatic pad on the side of the greatest pressure does not vary perceptibly in its contour and the air is not forced from that side of the saddle to the other side thereof, nor does the air move within the pad in such a way as to lift or move the rider. The depressions or perforations $a\ a$ tend to keep the rider in his proper position, and, when of the proper size, keep the saddle cool. The longitudinal perineal depressions extend to the rear of the saddle, if desired, in order to take pressure from the end of the spine. The pommel of the saddle is always soft and becomes more so when the pressure on the rear of the saddle is relieved, and thus the liability of accident is prevented when the rider is thrown forward upon the pommel. The use of soft or elastic rubber for the pneumatic tubes increases the flexibility, softness, and comfort of the saddle, and as the pneumatic tubes are held definitely in place between the rigid base-plate A and the flexible but inexpansible cover E, a firm and non-floating saddle is produced. The movement of the air in the tubes can only be from end to end thereof and cannot be from side to side with reference to the saddle, and the lacings may be easily loosened or detached in order to examine or remove the pneumatic tubes or to repair the saddle. The use of tubes also permits me to produce a saddle that is not too thick and that does not contain too great a volume of air, while at the same time having a sufficiently large surface.

It is obvious that the form of the base A may be much varied, the shape of the pads may be varied, as, for instance, by connecting the end $d^4$ or $d^5$ with its tube at the point of contact therewith, the manner of connecting the cover to the base may be varied, and that other changes of construction may be made without departing from the spirit of my invention or from the terms of the following claims.

What I claim is—

1. A saddle for bicycles and the like, comprising a rigid base-plate, a pair of independent elastic cushions arranged on opposite sides of the longitudinal line of the saddle, said cushions consisting of pneumatic tubes coiled at one end to conform to the seat portion proper and having the other end extending lengthwise into the pommel, and a flexible inexpansible cover secured to the base-plate at the outer edges and on the median longitudinal line of the saddle to form separate compartments for the tubes; substantially as described.

2. A saddle for bicycles and the like, comprising a rigid base-plate, a pair of independent elastic cushions arranged on opposite sides of the longitudinal line of the saddle and separated by a perineal longitudinal depression, said cushions consisting of pneumatic tubes coiled at one end to conform to the seat portion proper, and having their other ends extending lengthwise into the pommel; substantially as described.

3. A saddle for bicycles and the like, comprising a rigid base-plate having ventilating-openings about centrally of each half of the seat portion proper, a flexible inexpansible cover secured to said base-plate at the sides to hold it on, and at the edges of the ventilating-openings to continue said openings through the saddle and form pelvic-bone depressions, and connected thereto on the median longitudinal line of the saddle to form a perineal depression between said openings, and an independent tubular pneumatic pad inclosed between the base-plate and the cover on each side of the longitudinal center of the saddle, said pads surrounding the ventilating-openings at their rear ends, and extending forwardly into the pommel; substantially as described.

4. A saddle for bicycles and the like, comprising a rigid base-plate, a pair of independent pneumatic pads arranged on opposite sides of the central longitudinal line of the saddle with a perineal depression between them, and separate depressions for the pelvic bones on opposite sides of said line, said pads surrounding said hip-bone depressions and being supported upon the base-plate, and having a flexible inelastic cover removably secured to the plate at the edges and adjustably connected therewith on the central longitudinal line by lacing, whereby the cover is removable and the depth of the perineal depression regulable; substantially as described.

JAMES H. SAGER.

Witnesses:
M. F. REED,
CHAS. M. WILLIAMS.